T. L. REGAN.
SELF LOCKING SWINGING STANCHION.
APPLICATION FILED JULY 3, 1914.
1,148,191.
Patented July 27, 1915.
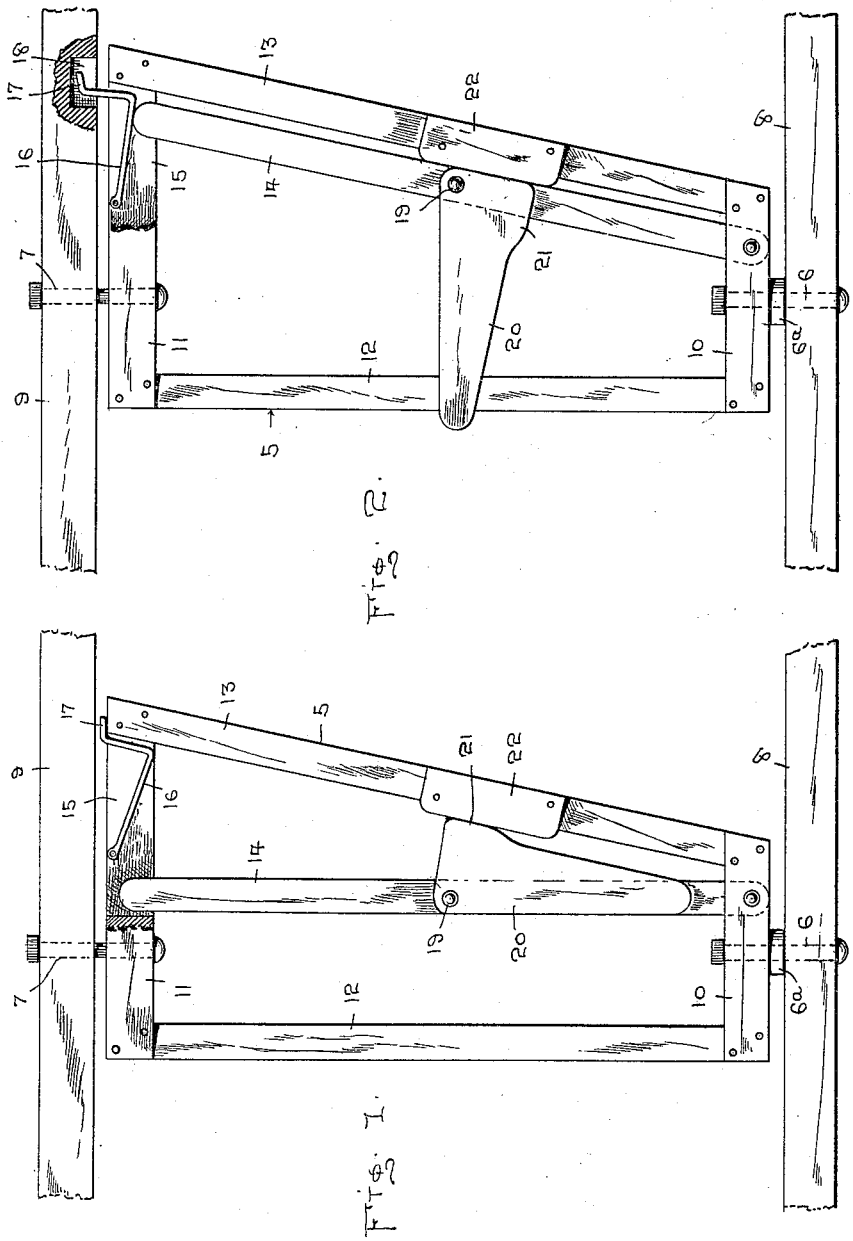

UNITED STATES PATENT OFFICE.

THOMAS L. REGAN, OF CAMDEN, NEW YORK.

SELF-LOCKING SWINGING STANCHION.

1,148,191.  Specification of Letters Patent.  Patented July 27, 1915.

Application filed July 3, 1914. Serial No. 848,814.

*To all whom it may concern:*

Be it known that I, THOMAS L. REGAN, a citizen of the United States, residing at Camden, in the county of Oneida and State of New York, have invented certain new and useful Improvements in Self-Locking Swinging Stanchions; and I do hereby declare the following to be a full, clear, and exact description of the invention, such as will enable others skilled in the art to which it appertains to make and use the same.

This invention relates broadly to cattle stanchions and more particularly relates to devices of this character which are designed to be operated by the animal on entering the stanchion so as to close the device to secure the animal until the latter is released by extraneous aid.

As a principal object this invention contemplates the provision of a cattle stanchion, an important component of which is a lever plate or trigger adapted to be encountered by the animal on entering the stanchion and to be given a movement thereby which shall close the stanchion upon the animal.

A further object is to provide means formed upon the animal actuated lever of an automatic cattle stanchion which shall prevent the opening of the stanchion by the animal until it is desired to release the latter.

A further aim is to provide in a swinging automatic cattle stanchion, means for the prevention of the swinging movement when the device is open and means whereby an animal actuated lever in operating to close the stanchion will also operate to release the first said means so that the swinging movement of the stanchion will be permitted when the animal is secured therein.

A still further aim of this invention is to accomplish the foregoing objects without employing resilient agencies to aid in the automatic working of the stanchion and to also provide a device of the type described which shall be constructed with such regard to proportion, number and arrangement of parts, as to be cheaply manufactured, be durable and efficient in operation and capable of being readily set up in operative position with a minimum expenditure of time and labor owing to the simplicity of construction.

The above and additional objects which will become apparent as the description of this invention proceeds are accomplished by such means as are illustrated in the accompanying drawings, described in the following specification and then more particularly pointed out in the claims which are appended hereto and form a part of this application.

With reference to the drawings, wherein I have illustrated the preferred embodiment of my invention as it is reduced to practice, and throughout the several views of which like characters of reference designate similar parts, Figure 1 is an elevation of my device showing the same in its closed position as it would appear after an animal had entered the stanchion, and, Fig. 2 is a similar view showing the stanchion as it appears when open and is set for the entrance of the animal.

Proceeding now to the description of the drawings, my stanchion comprises the frame 5 which is pivotally mounted for a swinging movement about a vertical axis by means of the pivot pins 6 and 7 which are respectively secured to the usual sill 8 and upper beam or top plate 9 and pass through the ends 10 and 11 of the frame 5 respectively.

The frame 5 as will be seen upon reference to the drawings, comprises the uprights 12 and 13 the former of which is vertical, the latter being upwardly and outwardly inclined from a perpendicular position, both of these uprights being suitably secured to the before mentioned end plates 10 and 11 at the extremities thereof, the whole frame being spaced from the sill 8 by any suitable means such as the washer 6ª which is positioned about the pivoting pin 6 as shown. The vertical upright 12 is adapted to form one portion of the animal gripping member and I provide to act as the other portion the movable beam 14 which is pivoted to the lower end plate 10 and is adapted to have its free extremity move within a slot 15 formed in the upper end plate 11. Pivoted to the walls of this slot 15 I provide the substantially L-shaped latch or locking lever 16 which is formed upon its shorter shank with the angular extension 17 adapted to rest upon the top of the inclined beam 13 when the latch is not in its locking position in order that it may be readily available for the locking movement to be hereinafter described. This latch when in its locking position as shown in Fig. 3 is adapted to be moved upwardly to a recess 18 formed in the underside of the top plate 9 and as will readily be seen prevents the swinging of the stanchion frame 5 about the pivoting points 6 and 7 when the extension 17 is received by this recess.

Near the center of the movable stanchion member 14 is pivoted as at 19 the animal actuated lever or trigger plate 20 which as shown is substantially a triangle in shape but formed with an offset or cam portion 21 upon the corner nearest the pivot 19. This trigger plate is of sufficient length to extend across the space between the stanchion members 12 and 14 even when that space is greatest as shown in Fig. 2 when the stanchion is ready for the entrance of the animal and the pivoted stanchion member 14 has been moved to take up a position parallel to the inclined beam 13. A suitable bearing block 22 is secured to the fixed frame member 13 and occupies that position which is illustrated and in which it is enabled to receive any thrust put upon the lever 20 when the latter is displaced by the entrance of an animal. This completes the enumeration of the various elements of my improved automatic stanchion the operation of which is as follows: With the stanchion set as in Fig. 2 the entrance of an animal when driven thereinto will dislodge the trigger plate 20 and by forcing it in the only direction in which it can be moved by the animal, that is downward, the cam surface or offset portion 21 is brought into contact with the block 22 as the trigger is rotated about its pivoting point 19 and as will readily be seen a movement of the pivoted stanchion member 14 is effected, the free end of the latter moving through an arc in the slot 15 until it occupies the position shown in Fig. 1 namely that of parallelism with the fixed stanchion member 12, the trigger 20 by this time depending vertically from its pivoting point and having the flattened surface of the cam portion 21 in contact with the block 22. It will be noted that the trigger is constructed so that when the side bearing the cam surface is parallel to the inclined frame member 13 the opposite side will be parallel to the movable stanchion member 14 the whole being further formed so that the trigger 20 in this position extends past the pivoted member 14 only on the side away from the animal. It will also be noted that the line of contact as illustrated in Fig. 1 between the cam surface 21 and the block 22 is adapted to be bisected by a perpendicular drawn to the contacting surfaces through the pivot pin 19. This construction makes it impossible for any rotary motion to be given to the pivoted trigger 20 by pressure of the animal against the movable stanchion member 14 as such pressure (which of course reacts upon the trigger 20 at right-angles to the contacting surface) will be transmitted directly to the pivot 19 so that the device is at substantially a "dead center" and no moment of rotation can be given the trigger 20, without such rotation it being impossible to release the animal. The proprietor of the stanchion however, is of course enabled to immediately release the animal by exerting a slight pressure upon the narrow end of the elongated lever 20 and rotating the same until it again occupies with the movable stanchion member 14 the position illustrated in Fig. 2.

The operation of the latch member by which the swinging of the stanchion frame 5 about its pivot points 6 and 7 is permitted or prevented, is coincident with the operation of the trigger 20 by contact therewith of the pivoted stanchion member 14. As shown in Fig. 1 and above described the L-shaped latch 16 is pivoted in the slot 15 near the top thereof and with its angular extension 17 upon the upper surface of the inclined beam 13 the angle of the L is in consequence near the bottom of the slot so that the body of the latch lever is interposed directly in the path of the free end of the movable lever 14, the stanchion frame as will readily be seen being capable of a swinging movement upon its pivots. When the animal has been released however and the movable stanchion 14 been moved to occupy the open position of Fig. 2, the free end of this stanchion will come in contact with the pivoted latch and will force the same upward until the extension 17 has entered the slot 18 at which time the swinging movement of the stanchion frame is prevented, the object of this being to keep the stanchion in readiness for the reëntrance of the animal which otherwise could not be assured if the stanchion frame was permitted to swing on its pivots and might often need manual adjustment before the cattle could enter, the necessity for this adjustment being by this means obviated.

It will be seen that in a cattle stanchion constructed as described in the foregoing that by the aid of only three elements namely the trigger, the pivoted stanchion member, and the latch, that I have accomplished the objects above set forth and without the employment of resilient agencies or other auxiliary means commonly used in automatic stanchions of this type and can accordingly claim the advantages and desirability set forth in the before mentioned object.

While in the foregoing however, I have thus illustrated in the drawings and described in the specification such combination and arrangement of elements as constitute the preferred embodiment of my invention I desire to emphasize the fact that I may make such minor changes in the matters of proportion and degree, in later adaptations of my device as shall not alter the spirit of my invention as defined in the appended claims.

What I claim is:

1. A cattle stanchion, comprising a rigid frame, a movable frame mounted in said rigid frame, a pivoted member in said movable frame, a bearing block rigidly mounted upon said movable frame, and a cam trigger pivoted to said pivoted member and frictionally engaging said bearing block, said trigger when in elevated position permitting said pivoted member to open, and closing said pivoted member when in a lowered position, the cam portion of said trigger preventing upward movement of said trigger through the medium of said bearing block.

2. A cattle stanchion, comprising a rigid frame, a movable frame mounted in said rigid frame having a pivoted member, a block having a bearing face rigidly mounted upon said movable frame, a trigger pivotally mounted upon said pivoted member adjacent said block, and a cam portion extended from said trigger adapted to engage the bearing surface of said block to prevent the movement of said pivoted member when said trigger is in a depressed position and to permit movement of said pivoted member when said trigger is in a raised position.

3. A cattle stanchion, comprising a rigid frame, a movable frame mounted in said rigid frame having a pivoted member, a bearing block arranged upon said movable frame, a trigger pivotally mounted to said pivoted member adjacent said bearing block, and an eccentrically disposed cam extension to said trigger adapted to engage said bearing block and retard upward swinging movement of said trigger after it has been depressed and to prevent movement of said pivoted member.

In testimony whereof I have signed my name to this specification in the presence of two subscribing witnesses.

THOS. L. REGAN.

Witnesses:
MELVILLE W. REES,
FRANK DRAKE.

Copies of this patent may be obtained for five cents each, by addressing the "Commissioner of Patents, Washington, D. C."